Aug. 9, 1960 R. C. HAWES 2,948,773

ELECTRICAL TERMINAL HAVING INSULATING BUSHING

Filed April 29, 1955

ROLAND C. HAWES,
INVENTOR.

BY Reed C. Lawlor
ATTORNEY

United States Patent Office 2,948,773

Patented Aug. 9, 1960

2,948,773

ELECTRICAL TERMINAL HAVING INSULATING BUSHING

Roland C. Hawes, 771 Oakglade Drive, Monrovia, Calif., assignor to Applied Physics Corporation, Pasadena, Calif., a corporation of California Filed Apr. 29, 1955, Ser. No. 504,925

11 Claims. (Cl. 174—153)

This invention relates to electrical terminals and more particularly to insertable electrical terminals having an insulating bushing with a metallic terminal positioned within the bushing, the terminal being suitable for insertion into a suitable opening in a panel or board or a chassis used for supporting the terminal.

There are many electronic structures which require the use of insulated terminals for component mounting or for lead interconnection. Many electronic structures are mounted on metallic chassis and whenever this is the case such chassis requires the use of terminals which are provided with some insulating means such as bushings or grommets or eyelets made of insulation material. In many instances, such insulation material is ceramic material, which is bonded to a metal eyelet which in turn is soldered or otherwise secured to the chassis. Other types of bushings are also used for mounting electrical terminals on metal terminal or component boards such as rubber bushings or bushings made of plastic material. In the structures of the above type either the terminal or the bushing may be composed of a large number of parts for enabling one to fasten the terminal to the component board. Such type of mounting increases the cost of the terminal unit and also makes its mounting a time-consuming operation, thus increasing the over-all cost of the electronic assemblies.

The present invention employs insulated terminals for component mounting or for a lead interconnection which can be mounted very readily and easily on metal terminal boards and which consist of only two parts, firstly, a centrally positioned metallic pin-type terminal, and secondly, a bushing made of plastic, the entire terminal assembly being press-fitted into a suitable opening provided in the terminal board. Accordingly, the terminal unit has no threaded shanks and nuts, and the pin terminal is a single-piece metallic pin which can be press-fitted into the insulation bushing previously inserted into the opening of the terminal board. The terminal unit is self-sealing and, to a certain degree, self-fastening. These properties are obtained by first inserting the bushing into the opening, inserting the pin into the bushing, and then expanding one end of the pin to seal and lock the terminal in place.

The terminal unit of this invention offers assembly economies enabling one to produce quickly and easily electronic assemblies at low cost. And, because of the use of suitable plastic materials for the bushing, the unit has very advantageous electronic characteristics such as low high-frequency losses, low dielectric constants, high specific and surface resistances, and reasonably wide range temperature cycling enabling one to solder lead wires to the pin without injuring the bushing. The terminal is also shock-proof, abrasion-proof, and is rigidly fastened to the chassis or the terminal board so as to provide a mechanically rigid support for any type of connection that may be used in utilizing this terminal unit.

It is therefore an object of this invention to provide an electrical terminal unit suitable for mounting on a terminal board, the unit comprising a resilient insulation bushing having two flanges and a cylindrical pin passing through the bushing, the pin having means for rigidly locking the bushing to the component board.

It is an additional object of this invention to provide an electrical terminal unit having a resilient or an elastic insulation bushing which can be press-fitted into an orifice in a terminal board, and a pin insertable into the bushing.

Still another object of this invention is to provide a self-sealing and self-fastening press-fit electrical terminal unit mountable on a metallic terminal board, the unit consisting of a resilient bushing and a pin having means for securing the press-fit bushing to the board.

Still another object of this invention is to provide a method of fastening electrical terminal units to terminal boards.

The foregoing and other objects of the invention will best be understood from the following specification taken in connection with the accompanying drawings which illustrate two embodiments of the invention and in which.

Figure 1:
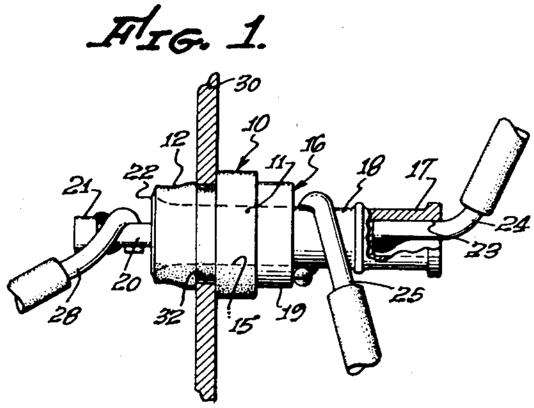
Figure 1 is a side view, partly in section, of the terminal unit mounted on the terminal board.
Figure 2:
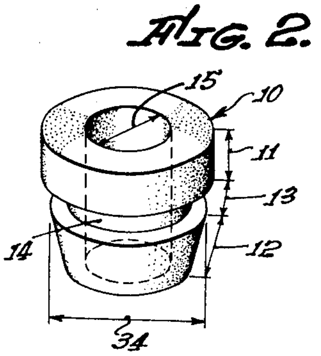
Fig. 2 is a perspective view of the resilient bushing or grommet.

Referring to Figures 1 through 5, the electrical terminal unit comprises an insulating bushing 10 made of resilient or elastic insulation material such as poly-tetrafluoro-ethylene which is also known by its trademark name "Teflon." While "Teflon" has proper elasticity, suitable mechanical strength and very desirable electrical characteristics, "Teflon" is not the only material which is suitable for making the bushing. Other elastic insulation materials having high electrical resistance, freedom from moisture absorption and resistance stability at soldering temperatures are polytrifluoromonochloroethylene, which is known as "Kel-F." What is meant by the elasticity or resiliency of the material, which is one of the desirable characteristics of the insulation material used for bushing 10, will be defined more fully later in the specification. The bushing has a flange 11 having a rectangular cross-section, and a flange 12 shaped as a truncated cone, the apex of the cone pointing in a direction away from a groove 13 and neck 14, both having rectangular cross-sections, the two flanges 11 and 12 being held together by neck 14. The bushing is also provided with a bore or a cylindrical opening 15. The bushing may also be described as including a ring, or washer 11, a second cone-shaped ring, or washer 12, the two washers being connected to each other by the neck 14, the above three elements having a common longitudinal axis and equal inner diameters so as to form a right cylinder opening through the bushing.

Figure 5:
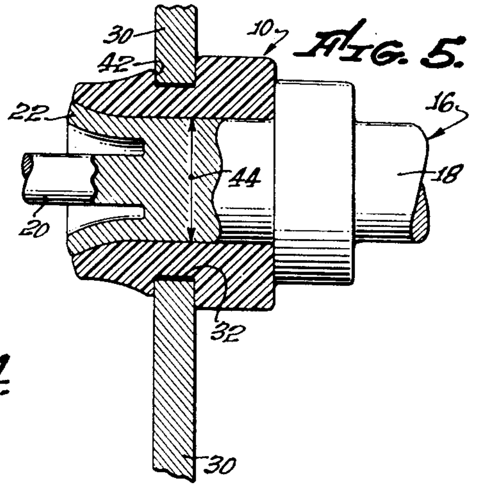
Fig. 5 is a side view, partly in section, of the terminal board, bushing, and of the pin with the eyelet portion of the pin being shown after it has been expanded.
Figure 4:
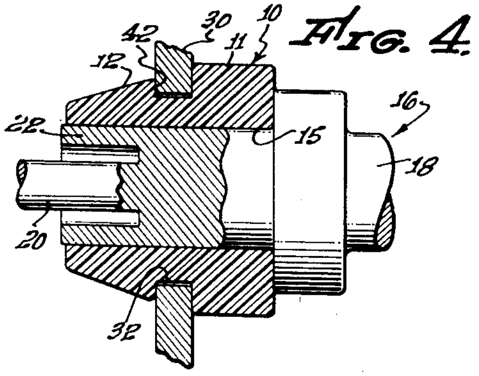
Fig. 4 is a side view, partly in section, of the terminal board, bushing and pin inserted into the bushing.

One type of pin terminal which is suitable for use in connection with the bushing is that illustrated in Figs. 1, 4 and 5. It is a pin terminal 16 which has lead-receiving shank parts 17 and 18, a flange 19, shank parts 20 and 21, and ring portion 22. The cross-sectional view of ring 22 is illustrated in Figs. 4 and 5. The shank portion 17—18 is provided with a blind hole 23 for connecting lead wires, such as 24, to the front portion of the terminal. The shank portion 17—18 is used in a conventional manner for connecting lead wires, such as wire 25, and the shank portion 20 is used for the same purpose. Fig. 1 illustrates a wire 28 connected to shank 20. It is to be understood that the pin may have any other type of end suitable for connecting lead wires.

The terminal unit is mounted on a metal terminal board 30. The mounting of the terminal unit on the board is accomplished as follows: the terminal board is provided with an opening or hole 32. The diameter 34 of the base of the cone-shaped flange is proportioned so as to slip through hole 32 without damaging the cone-shaped flange 12 of the bushing, the latter being deformed at the time of its insertion through the hole in the manner indicated by a dotted line 36 in Fig. 3. After the cone-shaped flange 12 passes through hole 32, because of the resilient nature of the material used for making the bushing, the deformed portion of the flange returns itself or shape back to its original shape illustrated by solid lines in Fig. 3. The width 38 of neck 13 of the bushing is made slightly larger than the thickness 40 of the panel board 30. Accordingly, the cone-shaped flange can be pressed through the hole in plate 30, taking advantage of the resilience of the insulation material. The bushing therefore retains itself on the board by means of a shoulder 42 after it is pressed through the hole of the panel.

After the bushing has been inserted into the hole, pin 16 is press-fitted through the bushing and the outer surface of the neck forms a tight press fit with hole 32. Although the bushing and the pin thus become fastened to the terminal board 30, the rigidity of their connection to the board is increased to a very large extent by expanding or spreading the ring portion 22 of the pin to form an eyelet in the manner illustrated in Fig. 5. Such expansion of eyelet 22 also expands the cone-shaped flange 12 with the result that the two flanges 11 and 12 of the bushing become press-fitted against the two opposite surfaces of the board 30. Expansion of the ring portion into the eyelet 22 also may be regarded as a step in which bushing 10 and pin 16 are locked to panel 30. This locking step is performed by suitably supporting flange 19 of the pin and exerting sufficient pressure on the ring portion 22 until bushing 10 is deformed to the extent indicated in Fig. 5. Because of the resilient nature of bushing 10 it deforms and grips panel 30 tightly without cracking the bushing and also without cracking the board.

Some of the dimensions of bushing 10 are proportioned carefully and may be considered as being critical if one is to obtain optimum functioning of the invention. These dimensions are the base diameter 34 of the cone-shaped flange, width 38 of the neck which accepts plate 30 and the outside diameter 44 of the neck. Among the three dimensions mentioned, diameter 34 is the most important. If it is smaller than the diameter of hole 32, shoulder 42 of the bushing has insufficient strength to hold the terminal securely against the board, while if it is much larger than the diameter of hole 32, shoulder 42 tends to shear off as the bushing is pressed through the hole, leaving an almost cylindrical section which does not secure the terminal adequately to board 30. When bushing 16 is made of "Teflon" the optimum dimension for diameter 34 is $$.200^{+.002''}_{-.000''}$$

when the bushing is designed to press into a 3/16 of an inch hole in a steel plate having a thickness of .035''. Though the diameter may differ somewhat from such optimum dimension it should not be greater than .205'' and should not be smaller than .199'', shoulder 42 has not sufficient strength to hold the terminal unit securely in the hole, while if it is larger than .205'' the shoulder tends to shear off as the bushing is pressed through the hole.

The order of the above mentioned dimensional tolerances is a function of the elasticity or the resiliency of the material, the larger is the elasticity the less critical is the maximum limit of diameter 34 and the more critical is the minimum limit for the same dimension. This is so because whenever the material has high elasticity it is relatively soft and therefore shoulder 42 must have sufficiently large dimensions for properly gripping plate 30. Dimension 34, therefore, for "Teflon" should be between 6% and 9% greater than the diameter of hole 32.

Figure 3:
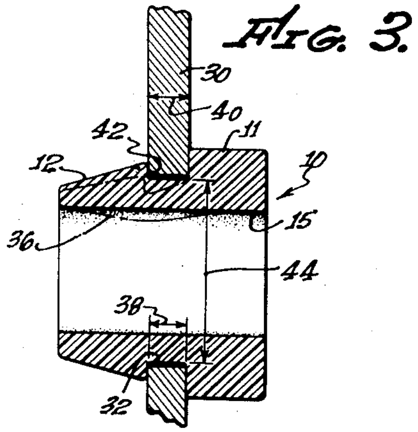
Fig. 3 is a sectional view of the bushing and the terminal board with the bushing being mounted on the terminal board.

As to the width 38 of the neck, it must be not less than .0015'' and not more than .045'' wider than the thickness of plate 30 when the latter thickness is .035'', in order to pass the conical portion of the bushing through the plate, permitting it to snap freely into the normal position illustrated in Fig. 3 and still grip the board sufficiently to avoid loose mounting of the bushing.

The outside diameter 44 of neck 14 may be slightly larger than the diameter of orifice 32. This dimension is not very critical and for "Teflon" bushings fitting into 3/16 inch hole it may be made equal to $$.187''^{+.003''}_{-.000''}$$

The disclosed electrical terminal unit therefore may be considered essentially as being a press-fitted terminal unit, only minor expansion of the eyelet 22 being necessary for tightening the bushing and the terminal pin upon their insertion into the terminal board. The steps for completing the assembly of the terminal unit, therefore, include press-fitting of bushing 10, insertion of pin 16, and expansion of eyelet 22, the last step producing a very rigid mounting of the pin which is desirable for obtaining shock-proof and vibration-proof electrical terminal units.

From the foregoing description of the invention it is apparent that an improved insulated electrical terminal has been provided which is reliable, durable, and otherwise effective when in use, and which may be easily and inexpensively installed by unskilled labor.

Although certain embodiments of the invention have been specifically illustrated and described herein, it will now be obvious to those skilled in the art that the invention is not limited thereto, but is capable of being embodied in many other forms. Various changes which will now suggest themselves to those skilled in the art may be made in the material, form, details of construction and arrangement of the parts without departing from the invention as defined by the appended claims.

The invention claimed is:

1. An electrical terminal unit normally fastened to a metallic plate having first and second surfaces and a circular opening in said plate, said terminal unit comprising a resilient insulation bushing having a first flange for engaging said first surface, a second flange being shaped as a truncated cone with the base of the cone resting on said second surface upon the insertion of said cone through said opening, a neck portion interconnecting said first and second flanges, and a single piece metallic terminal for riveting said bushing to said plate, said terminal having flange means abutting against said first flange, an expanded eyelet for expanding the outer end of said cone and for compressing the base of said cone against said second surface, and a cylindrical portion interconnecting said flange means and said eyelet, a part of said cylindrical portion being press-fit within said bushing to lock said bushing flanges in place on opposite sides of said plate.

2. An electrical terminal unit as defined in claim 1 in which said metallic terminal includes a first terminal member extending outwardly and beyond said flange means, and a second terminal member extending outwardly and beyond the cylindrical portion of said metallic terminal.

3. An electrical terminal unit including a preformed resilient insulating bushing having first and second flanges interconnected by a ring-shaped neck portion, said second flange having the shape of a truncated cone with the base of the cone engaging said neck portion, said cone being insertable through a hole in a terminal board, said hole having a smaller diameter than either bushing flange, said cone being so resilient as to render said cone adapted to expand toward its original shape after being inserted through said hole, and a single piece metallic pin passing through said bushing, said pin having a metallic flange on one side normally resting on said first flange and a cylindrical ring portion within the outer end of and concentric with said second flange, said ring portion being expandable into an eyelet for compressing said bushing flanges between said eyelet and said metallic flange and against surfaces on opposite sides of said terminal board, a part of said pin being adapted to be press-fit within said bushing to lock said bushing flanges in place on opposite sides of said terminal board.

4. An electrical terminal unit for insertion into a circular opening in a metallic terminal board, said terminal unit comprising a resilient preformed insulating bushing having first and second resilient flange members and a reduced neck portion interconnecting said flange members, said first flange member being tapered away from said neck for press-fitting said bushing into said board through said circular opening, said first flange member first contracting while being pressed through said opening and returning to its original shape upon emerging from said opening for engaging the adjacent surface of said board, said bushing having a cylindrical bore therethrough, a cylindrical metallic terminal pressure-fitting into said bore, said terminal having a metallic flange adjacent one end of said terminal, said metallic flange abutting against said second resilient flange member, and a ring-shaped member at the other end of said terminal, said ring-shaped member being concentric and approximately coextensive with said first resilient flange member, said ring-shaped member being expandable into an eyelet for tightly riveting said unit to said board, a part of said terminal constraining said bushing flange members against movement to lock said bushing on said terminal board.

5. An electrical terminal unit as defined in claim 4 in which said bushing is composed of a material having the mechanical properties of the polytetrafluoroethylene, and in which the outside diameter of the base of said tapered flange member is from 6% to 9% greater than the diameter of said circular opening.

6. An electrical terminal unit as defined in claim 4 in which said bushing is composed of a material having the mechanical properties of Teflon and in which the width of said neck is between about 10% and about 25% greater than the thickness of said board.

7. An electrical terminal unit as defined in claim 4 in which said bushing is composed of a material having the mechanical properties of Teflon and in which the outside diameter of said neck portion is about 1% greater than the diameter of said circular opening in said board.

8. An electrical terminal unit including a preformed resilient insulating bushing having first and second large terminal parts joined by a narrow intermediate part of reduced external diameter, said second terminal part being tapered toward one end of said bushing with the large end of said tapered part being adjacent said intermediate part, and a single-piece metallic pin passing through said bushing, said pin having an enlarged portion on one side thereof normally resting on the external side of the first large part of said bushing, said pin also having a locking portion extending through said second large member, said locking portion being bendable to engage said second large portion of said bushing parts to compress said bushing between said locking portion and said enlarged portion of said pin and against opposite surfaces of a terminal board, said tapered part being deformable to permit insertion through a terminal board hole that is smaller than said tapered part.

9. The method of attaching an electrical terminal unit to a metallic plate having first and second surfaces and a circular opening in said plate, said terminal unit having a preformed resilient insulating bushing with first and second flanges interconnected by a reduced neck, said second flange being shaped as a truncated cone with the base of the cone having a greater diameter than the diameter of said circular opening, said terminal unit also having a metallic cylindrical terminal having a shank with a flange-shaped extension on one side and a ring-shaped right cylinder extension on the other side, said method including the steps of placing said truncated cone flange into said circular opening, pressing said truncated cone flange through said opening by squeezing said cone through said opening until the base of said cone passes through said opening and snaps back to original shape, and, by returning to its original shape, engages the adjacent portion of the second surface of said metallic plate while the first flange engages the first surface of said plate, inserting said terminal into an opening in said bushing and press-fitting said shank into the neck portion of said bushing until the flange-shaped extension engages said first flange and said ring-shaped right cylinder extension is positioned approximately in a coextensive position with said truncated cone, and expanding said last extension into an eyelet for permanently and rigidly fastening said unit to said metallic plate.

10. An electrical terminal unit for insertion into a circular opening in a metallic terminal board, said terminal unit comprising a preformed resilient insulating bushing having first and second resilient flange members and a reduced neck portion interconnecting said flange members, said first flange member being tapered in outward direction for press-fitting said bushing into said panel through said circular opening, said first flange member first contracting while being pressed through said opening and returning to its original shape upon emerging from said opening for engaging the adjacent surface of said board, said bushing having a cylindrical bore therethrough, a cylindrical metallic terminal pressure-fitting into said bore, said terminal having a metallic flange adjacent one end of said terminal, said metallic flange abutting against said second resilient flange member, and a ring-shaped member at the other end of said terminal, said ring-shaped member being concentric and approximately coextensive with said first resilient flange member, said ring-shaped member being expandable into an eyelet for tightly riveting said unit to said board, a part of said terminal constraining said bushing flange members against radially inward movement to lock said bushing on said terminal board, said bushing being composed of a material having the mechanical properties of the polytetrafluoroethylene of Teflon and in which the outside diameter of the base of said tapered flange member is from 6% to 9% greater than the diameter of said circular opening, and also in which the width of said neck portion is between about 10% and about 25% greater than the thickness of said board.

11. In combination with a metallic terminal board, having a circular opening, an electrical terminal unit for insertion into said opening, said terminal unit comprising a resilient insulating bushing having first and second resilient flange members and a neck portion interconnecting said flange members, said first flange member being tapered in outward direction for press-fitting said bushing into said panel through said circular opening, said bushing being composed of a material having the mechanical properties of the polytetrafluoroethylene of Teflon and in which the outside diameter of the base of said tapered flange member is from 6% to 9% greater than the diameter of said circular opening, and also in which the width of said neck portion is between about 10% and about 25% greater than the thickness of said board, said first flange member being first contracted while being pressed through said opening and then returned to its original shape upon emerging from said opening for engaging the adjacent surface of said board, said bushing having a cylindrical bore therethrough, a unitary cylindrical metallic terminal having a stem pressure-fitted into said bore, said terminal having a metallic flange on said stem adjacent one end of said terminal, said metallic flange abutting against said second resilient flange member, and a ring-shaped member at the other end of said stem, said ring-shaped member being concentric and approximately coextensive with said first resilient flange member and said stem, said ring-shaped member being expanded into an eyelet for radially expanding said tapered flange member, said metallic flange and said expanded ring-shaped member compressing said tapered flange member axially to buttress said tapered flange member against said adjacent surface of said board, and said terminal member constraining said bushing flange members against inward movement to lock said bushing on said terminal board.

References Cited in the file of this patent

UNITED STATES PATENTS 2,104,217 Barnes ---------------- Jan. 4, 1938

2,225,472 Franklin ---------------- Dec. 17, 1940
2,291,430 Ingersoll ---------------- July 28, 1942
2,456,118 Foster ---------------- Dec. 14, 1948
2,475,448 Cusato ---------------- July 5, 1949
2,806,080 Corey ---------------- Sept. 10, 1957
2,816,950 Kruss et al. ---------------- Dec. 17, 1957

FOREIGN PATENTS 477,879 Great Britain ---------------- Jan. 7, 1938
641,917 Great Britain ---------------- Aug. 23, 1950

OTHER REFERENCES

U.S. Engineering Co. Standardized Electronic Hardware "Radio's Master," 18th Edition, 1953–54, page F–48.

UNITED STATES PATENT OFFICE

CERTIFICATE OF CORRECTION

Patent No. 2,948,773 August 9, 1960

Roland C. Hawes

It is hereby certified that error appears in the above numbered patent requiring correction and that the said Letters Patent should read as corrected below.

Column 3, line 66, after ".199" " insert -- . If the above diameter is smaller than .199" --; column 5, line 45, after "neck" insert -- portion --.

Signed and sealed this 8th day of October 1963.

(SEAL)
Attest:

ERNEST W. SWIDER
Attesting Officer

EDWIN L. REYNOLDS
Acting Commissioner of Patents